(12) United States Patent
O'Brien III et al.

(10) Patent No.: US 9,009,426 B1
(45) Date of Patent: Apr. 14, 2015

(54) METHODS, COMPUTER READABLE MEDIA, AND SYSTEMS FOR OPTIMIZING CACHE UTILIZATION

(75) Inventors: Walter A. O'Brien III, Westborough, MA (US); David W. Harvey, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 361 days.

(21) Appl. No.: 12/981,766

(22) Filed: Dec. 30, 2010

(51) Int. Cl.
  *G06F 12/02* (2006.01)
  *G06F 12/08* (2006.01)
  *G06F 3/06* (2006.01)

(52) U.S. Cl.
  CPC .......... *G06F 12/0866* (2013.01); *G06F 3/0608* (2013.01)

(58) Field of Classification Search
  CPC ..... G06F 3/0608; G06F 3/064; G06F 3/0641; G06F 3/067; G06F 3/0671; G06F 12/0866; G06F 12/0802; G06F 12/0864; G06F 2212/1044; G06F 2212/608
  See application file for complete search history.

(56) References Cited

U.S. PATENT DOCUMENTS

| | | | |
|---|---|---|---|
| 5,864,704 A * | 1/1999 | Battle et al. | 712/24 |
| 5,991,847 A * | 11/1999 | Ballard et al. | 711/3 |
| 6,425,053 B1 * | 7/2002 | Considine et al. | 711/114 |
| 2004/0010655 A1 * | 1/2004 | Tanaka et al. | 711/3 |
| 2005/0138318 A1 * | 6/2005 | Ash et al. | 711/156 |
| 2009/0300302 A1 * | 12/2009 | Vaghani | 711/162 |
| 2010/0070715 A1 * | 3/2010 | Waltermann et al. | 711/129 |
| 2011/0231594 A1 * | 9/2011 | Sugimoto et al. | 711/103 |

OTHER PUBLICATIONS

T10 Technical Committee of Accredited Standards, "Information Technology—SCSI BLock Commands—2 (SBC-2)," Jul. 28, 2001, Rev. 4, pp. 1-147.*

* cited by examiner

*Primary Examiner* — Michael Krofcheck
(74) *Attorney, Agent, or Firm* — Proskauer Rose LLP

(57) ABSTRACT

A method of storing data on a data storage device having a cache, includes receiving, by the data storage device, a write command indicating a data portion and a range of addresses on the data storage device, the write command instructing the data storage device to write the data portion to each address in the range of addresses; and storing, in the cache, indicia that each address in the range of addresses comprises the data portion.

12 Claims, 5 Drawing Sheets

METHODS, COMPUTER READABLE MEDIA, AND SYSTEMS FOR OPTIMIZING CACHE UTILIZATION

TECHNICAL FIELD

The description generally relates to methods, computer readable media, and systems for optimizing cache utilization. More particularly, the description relates to reducing the amount of data written to the cache in response to receiving commands to write data to outer level storage.

BACKGROUND

Many storage devices include caches. In general, a cache can include high-speed memory which sits between the outer level storage (e.g., disk drives) and hosts that issue commands to store data into and retrieve data from the outer level storage. When the host requests data from the outer level storage, a controller can move a copy of the data from the outer level storage into the cache memory. The host is provided the data from the cache memory. If the host requests the data again and if the copy of the data still resides in the cache memory, the host is provided the data from the cache memory without the controller accessing the outer level storage. When the host stores data to the outer level storage, the controller can write the data into the cache, and the controller can move a copy of the data into the outer level storage. In some caches, the controller substantially simultaneously writes the data to the outer level storage (e.g., a write-through cache). In some caches, the controller writes the data to the outer level storage at a later time (e.g., a write-back cache).

Hosts commonly need to write the same data to large segments of the outer level storage. For example, during initialization, a host can zero-out an entire disk drive or logical unit (e.g., fill each block on the disk drive or logical unit with zeroes). Some data storage devices implement some or all of the SCSI command protocol. When writing to such devices, some hosts use the WRITE SAME SCSI command to zero-out large segments of the outer level storage. The WRITE SAME SCSI command is useful for zeroing-out large segments of the outer level storage because the command indicates a block of data to be written to each address of a range of logical block addresses by providing only a single copy of the block of data. In a conventional storage device, such a WRITE SAME command can result in a block of data being written to the cache memory for each address in the range of logical block addresses. Writing redundant data to the cache is undesirable because it is an inefficient use of the cache memory.

SUMMARY

Optimizing the use of cache memory can lead to faster performance when writing to or reading from the outer level storage. Additionally, reducing the amount of data stored in the cache for each write can enable very large write caches (e.g., more writes can be cached because each write requires less cache memory). Accordingly, there exists a need for methods, computer readable media, and systems for reducing the amount of data written to cache memory in response to receiving commands to write data to outer level storage.

In general, in one aspect, there is a method of storing data on a data storage device having a cache and can include receiving, by the data storage device, a write command indicating a data portion and a range of addresses on the data storage device, the write command instructing the data storage device to write the data portion to each address in the range of addresses. The method can include storing, in the cache, indicia that each address in the range of addresses comprises the data portion.

In some embodiments, the method includes receiving, by the data storage device, a second write command to write a second data portion to an address in the range of addresses and updating the indicia to no longer indicate that the address comprises the data portion.

In general, in another aspect, there is a computer program product, tangibly embodied in a non-transitory computer readable storage medium, including instructions being operable to cause one or more data processing apparatus to receive, by the data storage device, a write command indicating a data portion and a range of addresses on the data storage device, the write command instructing the data storage device to write the data portion to each address in the range of addresses, and store, in a cache, indicia that each address in the range of addresses comprises the data portion.

In some embodiments, the computer program product further includes instructions being operable to cause one or more data processing apparatus to receive, by the data storage device, a second write command to write a second data portion to an address in the range of addresses, and update the indicia to no longer indicate that the address comprises the data portion.

In another aspect, there is a system including a data storage device to receive a write command indicating a data portion and a range of addresses on the data storage device, the write command instructing the data storage device to write the data portion to each address in the range of addresses. The system can also include a cache in communication with the data storage device, the cache configured to store indicia that each address in the range of addresses comprises the data portion.

In some embodiments, the data storage device is further configured to receive a second write command to write a second data portion to an address in the range of addresses and update the indicia to no longer indicate that the address comprises the data portion.

In some embodiments, the addresses in the range of addresses are logical block addresses and the write command indicates the range of addresses with a beginning logical block address that indicates a first logical block in the range and a number of logical blocks that indicates a number of logical blocks in the range.

In some embodiments, the write command is a WRITE SAME SCSI command.

In some embodiments, the indicia comprises a descriptor comprising the range of addresses and a reference to a buffer containing the data portion.

In some embodiments, the indicia includes a descriptor including the range of addresses and a reference that indicates the data portion consists of a predetermined value if the data portion consists of the predetermined value, and a descriptor including the range of addresses and a reference to a buffer containing the data portion if the data portion does not consist of the predetermined value.

In some embodiments, the indicia includes a descriptor including the range of addresses and a reference to a pre-allocated buffer consisting of a predetermined value if the data portion consists of the predetermined value, and a descriptor including the range of addresses and a reference to a buffer containing the data portion if the data portion does not consist of the predetermined value.

BRIEF DESCRIPTION OF THE DRAWINGS

The advantages of the methods, computer readable media, and systems described above, together with further advantages, can be better understood by referring to the following description taken in conjunction with the accompanying drawings. The drawings are not necessarily to scale, emphasis instead being placed upon the principles of the methods, computer readable media, and systems.

DETAILED DESCRIPTION

Figure 1:
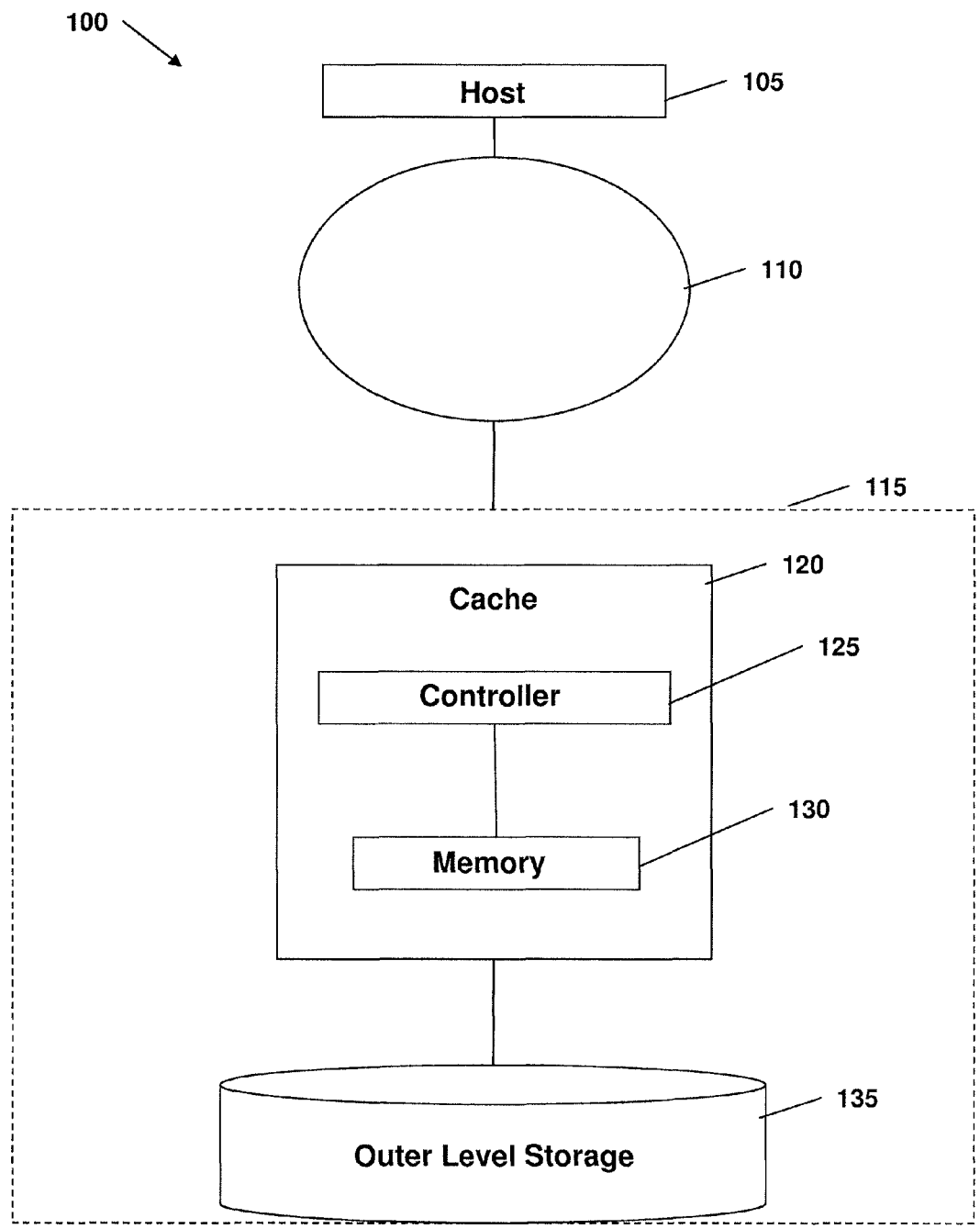
FIG. 1 depicts a data storage network including a host, a connection, and a data storage device.

In accordance with the subject matter disclosed herein, methods, computer readable media, and systems are described for reducing the amount of data written to cache memory in response to receiving commands to write data to outer level storage. FIG. 1 depicts a data storage network 100 including a host 105, a connection 110, and a data storage device 115. The data storage network 100 can be connected to one or more secondary networks (not shown), such as, for example, a local area network, a wide area network, or an intranet.

The host 105 can send various commands to the data storage device 115, such as, for example, data write commands (e.g., a command that data be written to the data storage device 115), data read commands (e.g., a command that data be read from the data storage device 115), and data copy commands (e.g., a command that a copy of data currently stored on the data storage device 115 be written to the data storage device 115).

The host 105 can be any device capable of communicating with the data storage device 115. For example, the host 105 can be a server, a personal computer, a mobile computing device, or a virtual machine running on any one of these.

As depicted in FIG. 1, the host 105 is coupled via the connection 110 with the data storage device 115. For example, the host 105 can be connected to the data storage device 115 via a fiber channel network or fabric. The host 105 can be connected to the data storage device 115 via a hard-wired network connection, such as an Ethernet connection. The host 105 can be connected to the data storage device 115 via a wireless communication channel running any of various protocols, such as, for example, IEEE 802.11 a, 802.11 b, 802.11 g, Wi-Fi, and/or Bluetooth.

In the illustrated embodiment, the data storage device 115 includes a cache 120. The cache 120 can include a controller 125 and a cache memory 130. The controller 125 can be any processor capable of causing data to be written to and read from the cache memory 130 and outer level storage 135. The cache memory 130 can be any form of volatile or non-volatile memory, or a combination of these. For example, the cache memory can be memory within a packaged microprocessor adjacent to the controller 125, allowing the controller 125 to read and/or write to the cache memory 130 quickly. The cache memory 130 can reside outside the packaged microprocessor but in close proximity to the controller 125. The cache memory 125 can be, for example, SRAM, DRAM, NAND, or Flash. In some embodiments, the cache 120 can be a multi-level cache, in which each cache level includes a separate memory and controller (not shown), as is well known in the art.

The data storage device 115 includes the outer level storage 135. The outer level storage 135 can include a plurality of target devices (not shown) for storing data. The target devices can include mechanical/magnetic hard drives, solid state hard drives, disc enclosures containing mechanical/magnetic hard drives or solid state hard drives, other storage devices, or other storage networks. The target devices can be configured to provide various levels of performance and/or high availability. For example, one or more of the target devices can be configured as a RAID array. The target devices can be a RAID 0 array, in which data is striped across storage targets. The target devices can be configured as a RAID 1 array, in which data is mirrored between target devices. The target devices can be a RAID 3, RAID 4, RAID 5 or RAID 6 array.

FIG. 1 depicts a logical view of the data storage device 115. The data storage device 115 can reside in a single enclosure or in multiple, connected enclosures. For example, the cache 120 can be in a physically-separate enclosure from the outer level storage 135. Similarly, the outer level storage 135 can include target devices in physically-separate enclosures. In embodiments where the data storage device 115 resides in multiple enclosures, the enclosures can be connected via, for example, any of the aforementioned networking methods.

The data storage device 115 can receive various data commands (e.g., data write commands, data read commands, or data copy commands) from the host 105. For example, the data storage device 115 can receive a write command (not shown) to write data to the outer level storage 135. The write command can indicate a data portion (not shown) and an address (not shown) on the outer level storage 135 to which to write the data portion. The data storage device 115 can cause the controller 125 to first write the data portion to the cache memory 130. The controller 125 can then cause the data portion from the cache memory 130 to be written to the outer level storage 135. In some embodiments, the data portion remains in the cache memory 130 for some amount of time before being written to the outer level storage 135.

The methods, computer readable media, and systems described herein can be used with data portions of any size. In some embodiments, a data portion can be one or more bytes of data. In some embodiments, a data portion can be a block of data, where the size of the block is determined by the particular embodiment. For example, the block can be the size of a logical block on the outer level storage 135. The block can be 512 bytes. In some embodiments, the data portion can be a file.

The process of writing data portions stored in the cache memory 130 to the outer level storage 135 at the address specified by the write command can be referred to as destaging. Destaging can occur for various reasons. For example, the data portions can become "cold" when the controller 125 has not read the data portion from the cache memory 130 for a length of time sufficient to deem the continued storage of the data portion within the cache memory 130 unnecessary. Upon the controller 125 determining that the data portion within the cache memory 130 has grown "cold", the controller 125 can cause the data portion to be destaged to the outer level storage 135. Destaging can result in the data portion remaining in both the cache memory 130 and the outer level storage 135. Destaging can result in deleting the data portion from the cache memory 130.

Figure 2:
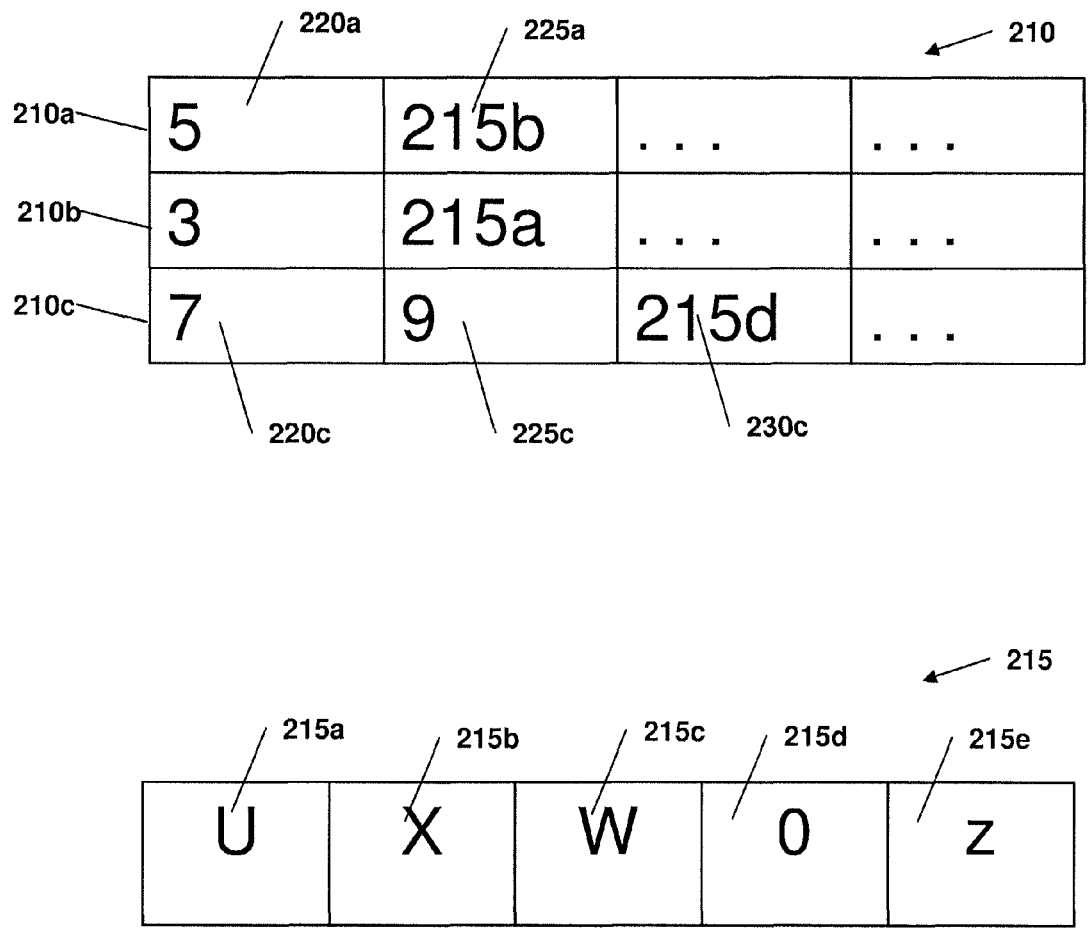
FIG. 2 depicts descriptors and buffers maintained by the cache.

The cache 120 can maintain information indicating the address on the outer level storage 135 to which data portions should be destaged. FIG. 2 depicts descriptors 210 and buffers 215 maintained by the cache 120. The descriptors 210 and the buffers 215 can be stored in the cache memory 130. The descriptors 210 are illustrated in a logical table format with each row representing a descriptor (e.g., descriptor 210a or descriptor 210b). In general, descriptors 210 each indicate one or more addresses on the outer level storage 135 and the data portion that is or should be stored at those addresses. For example, the descriptor 210a includes an address 220a of storage on the outer level storage 135 and a reference 225a indicating the data portion that is or should be stored in the outer level storage 135 at address 220a. In the example of the descriptor 210a, the reference 225a is a pointer to buffer 215b, which contains the data portion that is or should be stored at address 220a. The descriptors 210 and the buffers 215 can include other fields and data (e.g., time and date fields, authorization, or privilege fields) and can be implemented and stored in the cache memory 130 in a variety of ways, such as, for example tables, databases, linked lists, or hardware circuitry associated with cache lines.

Figure 3:
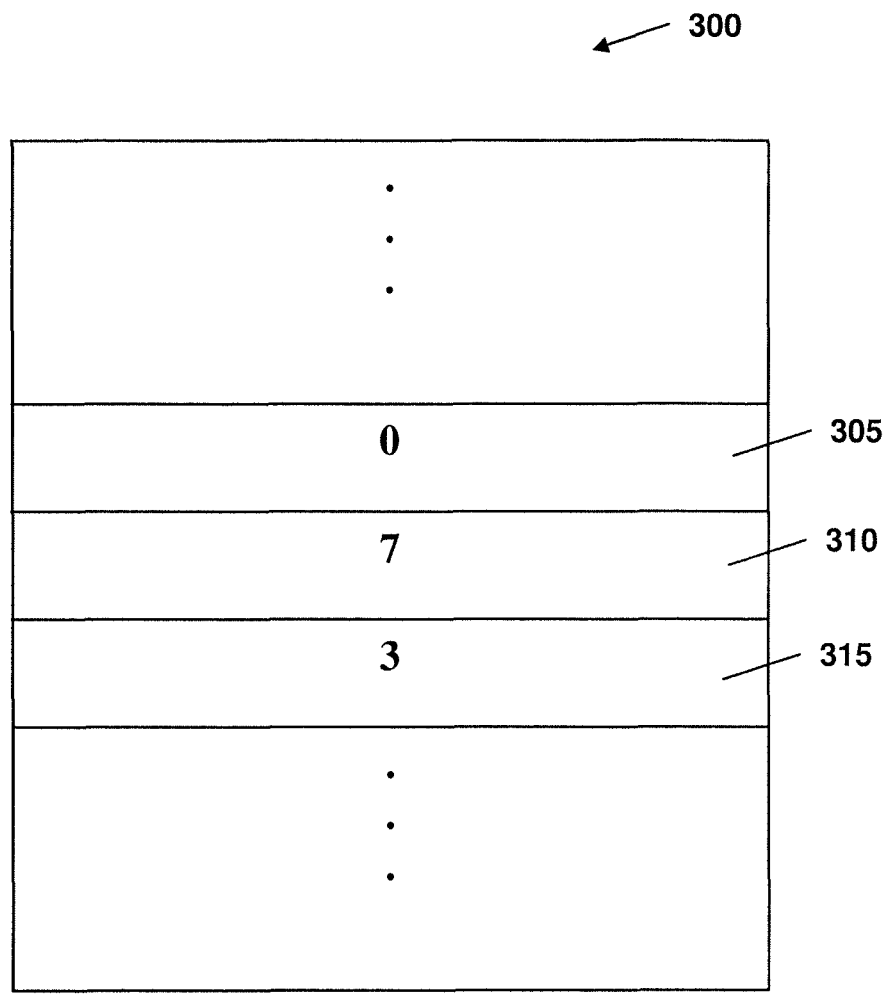
FIG. 3 depicts an example write command that can be received by the data storage device.

In some applications, the data storage device 115 can receive a write command indicating a data portion and a range of addresses on the data storage device 115. The command can instruct the data storage device 115 to write the data portion to the outer level storage 135 at each address in the range of addresses. In some applications, the addresses in the range of addresses are logical block addresses. The logical block addresses can be the logical block addresses of logical blocks on a disk drive, a raid array, or a storage device. The command can indicate the range of logical block addresses with a beginning logical block address and a number of logical blocks. FIG. 3 depicts an example write command 300 that can be received by the data storage device 115. The write command 300 includes a data portion 305, a beginning block address 310, and a number of blocks 315. In this example, the command 300 indicates that the data storage device should write a data portion consisting entirely of zeroes (the data portion 305) to 3 logical blocks (the number of blocks 315), beginning with the logical block at the logical block address 7 (the beginning block address 310). While the illustrated command 300 has a particular format, it should be understood that the write command can have other formats. For example, in some applications, the write command can be a WRITE SAME SCSI command.

The data storage device 115 can store, in the cache 120, indicia that each address in a range of addresses comprises a data portion. For example, the data storage device 115 can receive the command 300, and the controller 125 can store, in the cache memory 130, indicia that each address in the range of addresses consists of the data portion 305. In some embodiments, only one copy of the data portion is stored in the cache memory 130. For example, the controller 125 can copy the data portion 305 to the buffer 215d. The controller 125 can create descriptor 210c, where the descriptor 210c forms at least part of the indicia that each address in the range of addresses comprises the data portion 305. The descriptor 210c can include a beginning logical block address 220c, an ending logical block address 225c, and a reference 230c to the data portion that is or should be stored in the outer level storage 135 at addresses 220c through 225c. As illustrated, the descriptor 210c indicates that the outer level storage 135 at logical block addresses 7, 8, and 9 (as indicated by the beginning logical block address 220c and the ending logical block address 225c) consists or should consist entirely of zeroes (as indicated by the reference 230c and the contents of buffer 215d).

The data storage device 115 can receive a second write command (not shown) to write a data portion to an address in the range addresses, such as, the range of logical block addresses 7-9 (as indicated by the beginning logical block address 220c and the ending logical block address 225c). For example, the write command can instruct the data storage device 115 to write a data portion (not shown) to the logical block address 7. In response, controller 125 can alter the descriptor 210c such that it no longer indicates that logical block address 7 consists of the data portion stored in buffer 215d. The controller 125 can, for example, modify the beginning logical block address 220c by replacing logical block address 7 with logical block address 8. It should be understood that controller 125 can create a new descriptor (not shown) for the logical block address 7 in accordance with the prior described operation of the controller 125.

Figure 4:
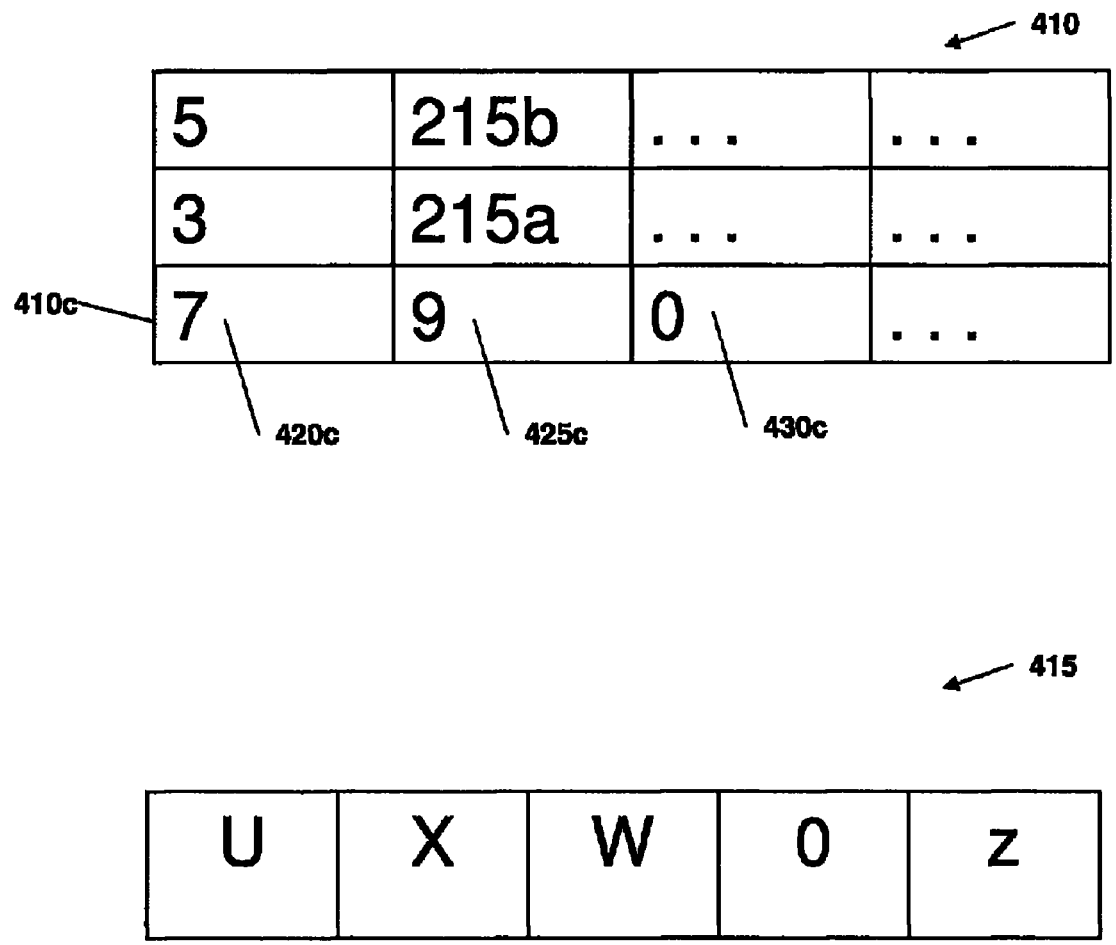
FIG. 4 depicts descriptors and buffers maintained by the cache.

FIG. 4 depicts descriptors 410 and buffers 415 maintained by the cache 120. In some embodiments, a reference 430c can be used to indicate that a predetermined value is or should be stored at each address in the range of addresses (as indicated by the beginning logical block address 420c and the ending logical block address 425c) without pointing to a buffer. For example, the reference 430c can be set to null or 0 (or any other special value that does not refer to a buffer 415) in response to a write command that indicates that the predetermined value should be written to the range of addresses. In some applications, for example, the data storage device 115 often receives a command to write a data portion consisting of zeroes to the outer level storage 135 at each address in a range of addresses. The controller 125 can create descriptor 410c that includes a beginning logical block address 420c, an ending logical block address 425c, and a reference 430c. The reference 430c can be set to null or zero to indicate that a data portion consisting of zeroes is or should be stored at each address in the range of addresses as indicated by the beginning logical block address 420c and the ending logical block address 425c without requiring a buffer 415.

In some embodiments, one or more buffers 215 or 415 can be pre-allocated with a predetermined value. For example, if the data storage device 115 often receives commands that indicate that the predetermined value should be written to a range of addresses, one or more buffers can be pre-allocated that consist of the predetermined value. The controller 125 can use the pre-allocated buffers to destage data portions to the outer level storage 135 as needed. For example, the controller 125 can copy a data portion from the pre-allocated buffers to the outer level storage 135.

Figure 5:
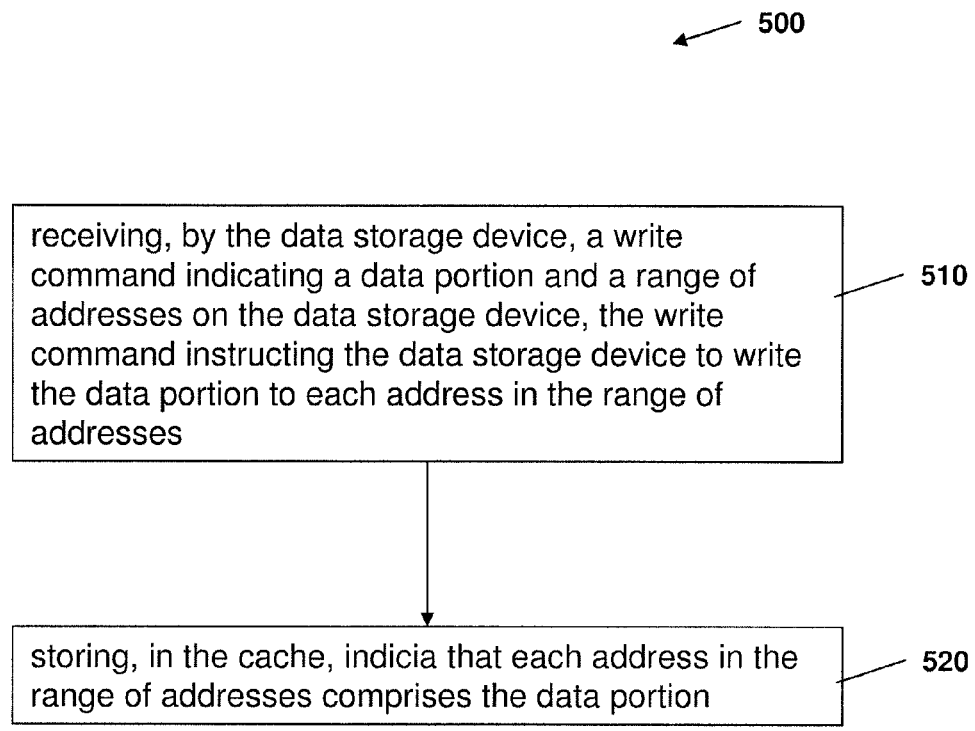
FIG. 5 depicts a flow chart illustrating a process for storing, in a cache, indicia that each address in a range of addresses comprises a data portion.

FIG. 5 depicts a flow chart 500 illustrating a process for storing, in a cache, indicia that each address in a range of addresses comprises a data portion. At step 510 a data storage device receives a write command indicating a data portion and a range of addresses on the data storage device, the write command instructing the data storage device to write the data portion to each address in the range of addresses. For example, the data storage device 115 can receive a write command indicating a data portion and a range of addresses on the data storage device 115. The command can instruct the data storage device 115 to write the data portion to the memory at each address in the range of addresses. As described above, the command can be the WRITE SAME SCSI command.

At step 520, indicia that each address in the range of addresses comprises the data portion is stored in the cache. For example, the controller 125 can create a descriptor (e.g., the descriptor 210c or the descriptor 410c) that forms at least part of the indicia that each address in the range of addresses comprises the data portion. The descriptor can include a beginning logical block address, an ending logical block address, and a reference. In some embodiments, the reference can be a pointer to the data portion that is or should be stored at each address in the range of addresses. In some embodiments, the descriptor can be a special value that indicates that a predetermined value is or should be stored at each address in the range of addresses.

While this invention has been particularly shown and described with references to preferred embodiments thereof, it will be understood by those skilled in the art that various changes in form and details can be made therein without departing from the spirit and scope of the invention as defined by the appended claims.

The invention claimed is:

1. A method of storing data on a data storage device having a cache, comprising:
    receiving, by the data storage device, a write command indicating a data portion and a range of addresses on the data storage device, the write command instructing the data storage device to write the data portion to each address in the range of addresses; and
    storing, in the cache, indicia referencing a single stored instance of the data portion and indicating that each address in the range of addresses comprises the data portion, wherein the indicia comprises a descriptor comprising:
        a beginning address of the range of addresses and an ending address of the range of addresses;
        a reference that indicates the data portion consists of a predetermined value if the data portion consists of the predetermined value, wherein the reference does not point to a buffer containing the data portion, and
        a reference to a buffer containing the data portion if the data portion does not consist of the predetermined value.

2. The method of claim 1, wherein the addresses in the range of addresses are logical block addresses and the write command indicates the range of addresses with a beginning logical block address that indicates a first logical block in the range and a number of logical blocks that indicates a number of logical blocks in the range.

3. The method of claim 1, wherein the write command is a WRITE SAME SCSI command.

4. The method of claim 1, further comprising:
    receiving, by the data storage device, a second write command to write a second data portion to an address in the range of addresses; and
    updating the indicia to no longer indicate that the address comprises the data portion.

5. A computer program product, tangibly embodied in a non-transitory computer readable storage medium, including instructions being operable to cause one or more data processing apparatus to:
    receive, by the data storage device, a write command indicating a data portion and a range of addresses on the data storage device, the write command instructing the data storage device to write the data portion to each address in the range of addresses;
    store, in a cache, indicia referencing a single stored instance of the data portion and indicating that each address in the range of addresses comprises the data portion, wherein the indicia comprises a descriptor comprising a beginning address of the range of addresses and an ending address of the range of addresses; a reference that indicates the data portion consists of a predetermined value if the data portion consists of the predetermined value, wherein the reference does not point to a buffer containing the data portion, and a reference to a buffer containing the data portion if the data portion does not consist of the predetermined value.

6. The computer program product of claim 5, wherein the addresses in the range of addresses are logical block addresses and the write command indicates the range of addresses with a beginning logical block address that indicates a first logical block in the range and a number of logical blocks that indicates a number of logical blocks in the range.

7. The computer program product of claim 5, wherein the write command is a WRITE SAME SCSI command.

8. The computer program product of claim 5, further including instructions being operable to cause one or more data processing apparatus to:
    receive, by the data storage device, a second write command to write a second data portion to an address in the range of addresses; and
    update the indicia to no longer indicate that the address comprises the data portion.

9. A system comprising:
    a data storage device to receive a write command indicating a data portion and a range of addresses on the data storage device, the write command instructing the data storage device to write the data portion to each address in the range of addresses;
    a cache in communication with the data storage device, the cache configured to store indicia referencing a single stored instance of the data portion and indicating that each address in the range of addresses comprises the data portion, wherein the indicia comprises a descriptor comprising a beginning address of the range of addresses and an ending address of the range of addresses, a reference that indicates the data portion consisting of a predetermined value if the data portion consists of the predetermined value, wherein the reference does not point to a buffer containing the data portion, and a reference to a buffer containing the data portion if the data portion does not consist of the predetermined value.

10. The system of claim 9, wherein the addresses in the range of addresses are logical block addresses and the write command indicates the range of addresses with a beginning logical block address that indicates a first logical block in the range and a number of logical blocks that indicates a number of logical blocks in the range.

11. The system of claim 9, wherein the write command is a WRITE SAME SCSI command.

12. The system of claim 9, wherein the data storage device is further configured to receive a second write command to write a second data portion to an address in the range of addresses and update the indicia to no longer indicate that the address comprises the data portion.

* * * * *